US009506253B2

(12) United States Patent
Rosko et al.

(10) Patent No.: US 9,506,253 B2
(45) Date of Patent: Nov. 29, 2016

(54) MOLDED WALL UNIT (71) Applicant: Delta Faucet Company, Indianapolis, IN (US)

(72) Inventors: Michael Scot Rosko, Greenwood, IN (US); Bernd Seckler, McCordsville, IN (US); Paul V. Patton, Indianapolis, IN (US)

(73) Assignee: Delta Faucet Company, Indianapolis, IN (US)

( * ) Notice: Subject to any disclaimer, the term of this patent is extended or adjusted under 35 U.S.C. 154(b) by 0 days.

(21) Appl. No.: 14/738,427

(22) Filed: Jun. 12, 2015

(65) Prior Publication Data
US 2015/0361673 A1  Dec. 17, 2015

Related U.S. Application Data (60) Provisional application No. 62/012,743, filed on Jun. 16, 2014, provisional application No. 62/117,931, filed on Feb. 18, 2015.

(51) Int. Cl.
*A47K 3/16* (2006.01)
*E04F 13/08* (2006.01)
*E04B 1/68* (2006.01)
(Continued)

(52) U.S. Cl.
CPC ....... *E04F 13/0873* (2013.01); *B29C 33/3857* (2013.01); *E04B 1/6815* (2013.01); *E04F 13/072* (2013.01); *E04F 13/0898* (2013.01); *E04F 13/18* (2013.01); *E04F 13/185* (2013.01); *E04F 19/02* (2013.01); *E04F 19/064* (2013.01);
(Continued)

(58) Field of Classification Search
CPC .......... B29C 33/3857; B29K 2055/02; B29L 2031/776; E04B 1/6815; E04F 13/072; E04F 13/0873; E04F 13/0898
USPC ...... 52/35, 272, 506.01, 746.12; 4/596, 600, 4/612, 613, 614
See application file for complete search history.

(56) References Cited

U.S. PATENT DOCUMENTS 2,202,568 A  5/1940  Worden
3,055,148 A  9/1962  Christy
(Continued)

FOREIGN PATENT DOCUMENTS

CN  102720376  10/2012
DE  102006037796  2/2008
(Continued)

OTHER PUBLICATIONS

Mosaic Art Supply; Tile Mount Grid; http://www.mosaicartsupply.com/mounting-grid-3-4-inch-mosaic-tile-aspx; Feb. 12, 2014.
(Continued)

*Primary Examiner* — James Buckle, Jr.
(74) *Attorney, Agent, or Firm* — Faegre Baker Daniels, LLP (57) ABSTRACT

A bathroom wall unit includes a molded wall panel formed of a polymer and defining a recessed pocket. A flexible substrate supporting mosaic tiles is illustratively coupled to a rear wall of the recessed pocket. Surface treatment is illustratively provided within linear indentations in the wall panel to simulate grout lines. A connecting bracket illustratively includes first and second pairs of arms supporting seals and defining first and second recesses for receiving mounting flanges of a pair of the wall panels.

29 Claims, 12 Drawing Sheets

(51) Int. Cl.
*E04F 13/072* (2006.01)
*E04F 13/18* (2006.01)
*B29C 33/38* (2006.01)
*E04F 19/02* (2006.01)
*E04F 19/06* (2006.01)
*B29K 55/02* (2006.01)
*B29L 31/00* (2006.01)

(52) U.S. Cl.
CPC ...... *B29K 2055/02* (2013.01); *B29L 2031/776* (2013.01); *E04F 2290/00* (2013.01)

(56) References Cited

U.S. PATENT DOCUMENTS

| | | | |
|---|---|---|---|
| 3,691,711 | A | 9/1972 | Lowery |
| 3,992,825 | A | 11/1976 | May |
| 4,128,982 | A | 12/1978 | Weaver |
| 4,169,907 | A | 10/1979 | Barker et al. |
| 4,289,818 | A | 9/1981 | Casamayor |
| 4,384,377 | A | 5/1983 | Calvert et al. |
| 4,385,850 | A | 5/1983 | Bobath |
| 4,671,026 | A | 6/1987 | Wissinger |
| 4,689,930 | A | 9/1987 | Menchetti |
| 4,917,528 | A | 4/1990 | Shewchuk |
| 4,993,201 | A | 2/1991 | Bunyard |
| 5,142,836 | A | 9/1992 | Kearns |
| 5,159,723 | A | 11/1992 | Benedict |
| 5,263,294 | A | 11/1993 | Koenig et al. |
| 5,280,052 | A | 1/1994 | Questel et al. |
| 5,303,519 | A | 4/1994 | Mustee et al. |
| 5,444,953 | A | 8/1995 | Koenig et al. |
| 5,606,752 | A | 3/1997 | Shenton |
| 5,619,826 | A * | 4/1997 | Wu .................................. 52/35 |
| 5,806,270 | A | 9/1998 | Solano et al. |
| 5,866,225 | A | 2/1999 | Crossley |
| 5,950,370 | A | 9/1999 | Peck |
| 6,199,545 | B1 | 3/2001 | Adamson |
| 6,264,873 | B1 | 7/2001 | Gigl et al. |
| 6,311,442 | B1 * | 11/2001 | Watanabe .................... 52/282.3 |
| 6,413,618 | B1 | 7/2002 | Parker et al. |
| 6,516,476 | B1 | 2/2003 | Thums |
| 6,551,678 | B1 | 4/2003 | O'Brien et al. |
| 6,751,916 | B1 | 6/2004 | Ritzer et al. |
| 7,028,349 | B2 | 4/2006 | Helmetsie et al. |
| 7,383,670 | B1 | 6/2008 | Meyers |
| 7,562,504 | B2 | 7/2009 | Herbst |
| 7,748,527 | B2 | 7/2010 | Wisecarver et al. |
| 7,877,825 | B1 * | 2/2011 | Marshall et al. ................ 4/612 |
| 8,141,182 | B2 | 3/2012 | Cook |
| 8,201,373 | B2 | 6/2012 | Charles, Jr. |
| 8,484,771 | B2 | 7/2013 | Wilson et al. |
| 8,603,613 | B2 | 12/2013 | Larson |
| 8,702,886 | B2 | 4/2014 | Yaniv et al. |
| 8,869,321 | B2 | 10/2014 | Donnelly et al. |
| 2002/0071930 | A1 | 6/2002 | Oakey et al. |
| 2004/0078890 | A1 * | 4/2004 | Tavivian ........................... 4/596 |
| 2004/0093819 | A1 | 5/2004 | Ritzer |
| 2004/0226230 | A1 | 11/2004 | Ritzer |
| 2005/0086736 | A1 * | 4/2005 | Helmetsie et al. ............... 4/596 |
| 2005/0129913 | A1 | 6/2005 | Kobayashi et al. |
| 2007/0117496 | A1 | 5/2007 | Maron |
| 2007/0187864 | A1 | 8/2007 | Mincey et al. |
| 2008/0022452 | A1 * | 1/2008 | Lock et al. ....................... 4/614 |
| 2008/0115437 | A1 | 5/2008 | Brodener |
| 2008/0250558 | A1 | 10/2008 | Torres |
| 2008/0313981 | A1 | 12/2008 | Donley et al. |
| 2009/0266804 | A1 | 10/2009 | Costin et al. |
| 2009/0313919 | A1 | 12/2009 | Chuang |
| 2010/0176101 | A1 | 7/2010 | Costin et al. |
| 2010/0183822 | A1 | 7/2010 | Ruggie et al. |
| 2010/0263323 | A1 | 10/2010 | Trinidade et al. |
| 2012/0082839 | A1 | 4/2012 | Ha et al. |
| 2012/0288642 | A1 | 11/2012 | Smith |
| 2012/0317913 | A1 | 12/2012 | Equivel |
| 2013/0019552 | A1 | 1/2013 | Murdock et al. |
| 2013/0104757 | A1 | 5/2013 | Smith |
| 2013/0265350 | A1 | 10/2013 | Costin, Sr. et al. |
| 2013/0276226 | A1 | 10/2013 | Cook et al. |
| 2013/0284355 | A1 | 10/2013 | Farrage, Jr. et al. |
| 2014/0250585 | A1 | 9/2014 | Slothower et al. |
| 2014/0259369 | A1 | 9/2014 | Zimbric |
| 2015/0074897 | A1 * | 3/2015 | Cook ................................ 4/612 |
| 2015/0107018 | A1 * | 4/2015 | Vageeds .......................... 4/584 |

FOREIGN PATENT DOCUMENTS

| | | |
|---|---|---|
| EP | 1 726 737 B1 | 9/2010 |
| GB | 1207685 | 10/1970 |
| GB | 2 418 933 | 4/2006 |
| GB | 2 452 979 | 3/2009 |
| WO | WO 2009/050476 | 4/2009 |
| WO | WO 2011/142759 | 11/2011 |
| WO | WO 2012/059712 | 5/2012 |
| WO | WO 2013/049927 | 4/2013 |

OTHER PUBLICATIONS

Decorating Ceramic Tiles; http://www.taptilecontrols.com/bathroom/pdfs/manuals/Tile_decoration_v3.pdf; 2013; 4 pgs.

Duma-Pan Interlocking PVC Panels; Decorative Interlocking PVC Walls and Ceiling Panels; retrieved from http://www.dumaplast.ca on Dec. 12, 2014.

Acrylic Bathroom Wall Panels, A Guide to Selecting and Purchasing Acrylic Bathroom Wall Panels; retrieved from https://sites.google.com/site/acrylicbathroomwallpanels on Dec. 5, 2014.

Zelletex, PVC Shower Wall Paneling; retrieved from http://zelletex.com.au/pvc-bathroom-panels/pvc-shower-paneling on Dec. 5, 2014.

Gruber, Molds: Wall Panels; retrieved from http://www.gruber-systems.com/products/molds/wallpanel-molds.html retrieved from http:www.gruber-systems.com/roducts/molds/wallpanel-molds.html on Dec. 5, 2014.

Array Showers; Sold Surface Shower Systems and Sheets; retrieved from http://www.arrayshowers.com on Dec. 5, 2014.

American Standard; ACRYLUX 60 Inch by 30 Inch Tile Bath Wall Set; retrieved on Dec. 5, 2014.

Best Bath Systems; Best Bath Systems® Bathing Solutions; © 2015; 2 pgs.

* cited by examiner

MOLDED WALL UNIT

CROSS-REFERENCE TO RELATED APPLICATIONS

This application claims priority to U.S. Provisional Patent Application Ser. No. 62/012,743, filed Jun. 16, 2014, and to U.S. Provisional Patent Application Ser. No. 62/117,931, filed Feb. 18, 2015, the disclosures of which are expressly incorporated herein by reference.

BACKGROUND AND SUMMARY

The present invention relates generally to molded wall panels and, more particularly, to molded wall panels used in bathroom tub and shower installations.

It is well known to provide tub and shower wall panels molded from a polymer to simulate ceramic tile. More particularly, such wall panels typically include indentations between adjacent rectangular raised portions to simulate grout lines between adjacent tiles. However, such molded wall panels often fail to closely resemble ceramic tiles with conventional grout lines. Additionally, such molded wall panels typically provide a limited number of design options.

Consumers would like to have the ability to customize their tub and shower walls, but often cannot afford a complete tile installation. While many consumers would prefer to have ceramic tile installations, this is often prohibitive due to cost and installation time.

As such, it is desired to provide cost effective, molded wall panels that more closely resemble the appearance of traditional ceramic tile and authentic grout lines, and that are simple to install. Additionally, it is desired to provide such molded wall panels that include a variety of design options that may be customized by the user.

According to an illustrative embodiment of the present disclosure, a bathroom wall unit includes a wall panel formed from a polymer received within a mold defined by a negative impression of a ceramic tile assembly. The wall panel includes a front surface, a rear surface, a first side edge, a second side edge, an upper edge and a lower edge. The front surface and the rear surface extend between the first and second side edges, and extend between the upper and lower edges. The wall panel may further include a plurality of linear indentations, a plurality of raised polygonal portions defined between the linear indentations, and a recessed pocket having a rear wall, an upper wall and a lower wall. A plurality of mosaic tiles may be received within the recessed pocket. A flexible substrate illustratively supports the mosaic tiles and is coupled to the rear wall of the recessed pocket. An adhesive illustratively secures the flexible substrate to the rear wall of the recessed pocket.

According to another illustrative embodiment of the present disclosure, a bathroom wall unit includes a molded wall panel formed of a polymer and having a front surface, a rear surface, a first side edge, a second side edge, an upper edge and a lower edge. The front surface and the rear surface extend between the first and second side edges, and extend between the upper and lower edges. The wall panel further illustratively includes a plurality of linear indentations, a plurality of raised polygonal portions defined between the linear indentations, and a recessed pocket having a rear wall, an upper wall and a lower wall. A plurality of ceramic tiles are illustratively received within the recessed pocket. Simulated grout is illustratively formed within the linear indentations.

In a further illustrative embodiment of the present disclosure, a method of forming a bathroom wall unit includes the steps of molding within a polymer panel a plurality of linear indentations, a plurality of raised polygonal portions defined between the linear indentations, and a recessed pocket. The method further includes the steps of surface treating the plurality of linear indentations to simulate grout lines, and adhering a plurality of ceramic tiles within the recessed pocket.

According to a further illustrative embodiment of the present disclosure, a method of forming a bathroom wall unit includes the steps of arranging a plurality of ceramic tiles on a support surface, grouting between the plurality of ceramic tiles to define a ceramic tile assembly, and applying a liquid material over the ceramic tile assembly. The illustrative method further includes the steps of setting the liquid material to a solid material, removing the ceramic tile assembly from the solid material to define a mold, and applying a polymer to the mold. The illustrative method further includes the step of molding within the polymer a plurality of linear indentations, a plurality of raised polygonal portions defined between the linear indentations, and a recessed pocket.

According to another illustrative embodiment of the present disclosure, a bathroom wall unit includes a first wall panel having a front surface, a rear surface, a first side edge, a second side edge, an upper edge, a lower edge, a first mounting flange supported by the first side edge, and a second mounting flange supported by the second side edge. The bathroom wall unit further includes a second wall panel having a front surface, a rear surface, a first side edge, a second side edge, an upper edge, a lower edge, a first mounting flange supported by the first side edge, and a second mounting flange supported by the second side edge. A connecting bracket includes a body formed of a first material and including a first pair of arms having a first inner arm and a first outer arm defining a first recess, and a second pair of arms having a second inner arm and a second outer arm defining a second recess. The second mounting flange of the first wall panel is received within the first recess, and the first mounting flange of the second wall panel is received within the second recess. A first seal is supported by one of the first inner arm and the first outer arm.

According to a further illustrative embodiment of the present disclosure, a connecting bracket for a bathroom wall unit includes a body formed of a first material and including the first pair of arms having a first inner arm and a first outer arm defining a first recess, and second pair of arms having a second inner arm and a second outer arm defining a second recess. A first inner seal is supported by the first inner arm, and a second inner seal is supported by the second inner arm. The first inner seal and the second inner seal are formed of a second material softer than the first material. The body, the first inner seal and the second inner seal are co-extruded.

Additional features and advantages of the present invention will become apparent to those skilled in the art upon consideration of the following detailed description of the illustrative embodiment exemplifying the best mode of carrying out the invention as presently perceived.

BRIEF DESCRIPTION OF THE DRAWINGS

The detailed description of the drawings particularly refers to the accompanying figures in which.

DETAILED DESCRIPTION OF THE DRAWINGS

The embodiments of the invention described herein are not intended to be exhaustive or to limit the invention to precise forms disclosed. Rather, the embodiments selected for description have been chosen to enable one skilled in the art to practice the invention.

Figure 1:
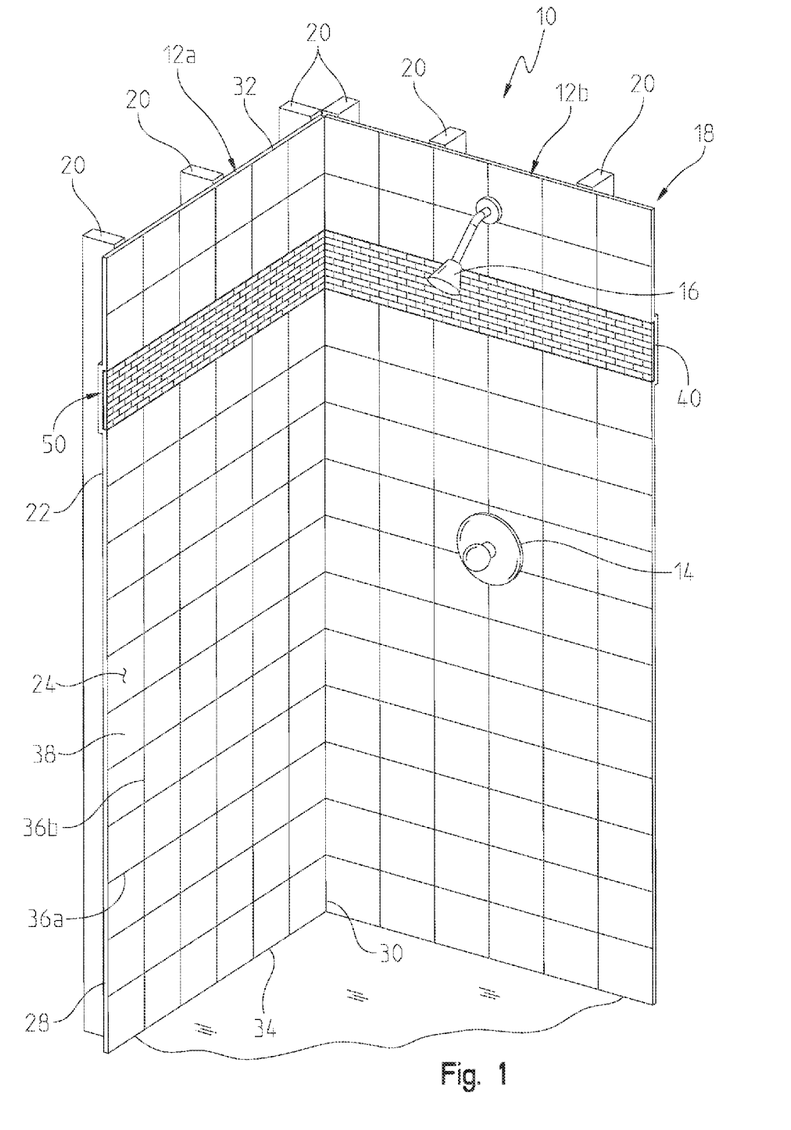
FIG. 1 is a perspective view of an illustrative shower enclosure including wall units of the present disclosure.

Referring initially to FIG. 1, a shower enclosure 10 including illustrative bathroom wall units 12a, 12b of the present disclosure is shown. The shower enclosure 10 supports a faucet 14 for controlling water flow through a showerhead 16. The wall units 12a, 12b are illustratively supported by a wall 18 including mounting studs 20. While the wall units 12 are shown for use with a shower enclosure 10, it should be appreciated that the wall units 12 may be used in a variety of installations, such as in connection with bath tubs, vanities and kitchens.

Figure 2:
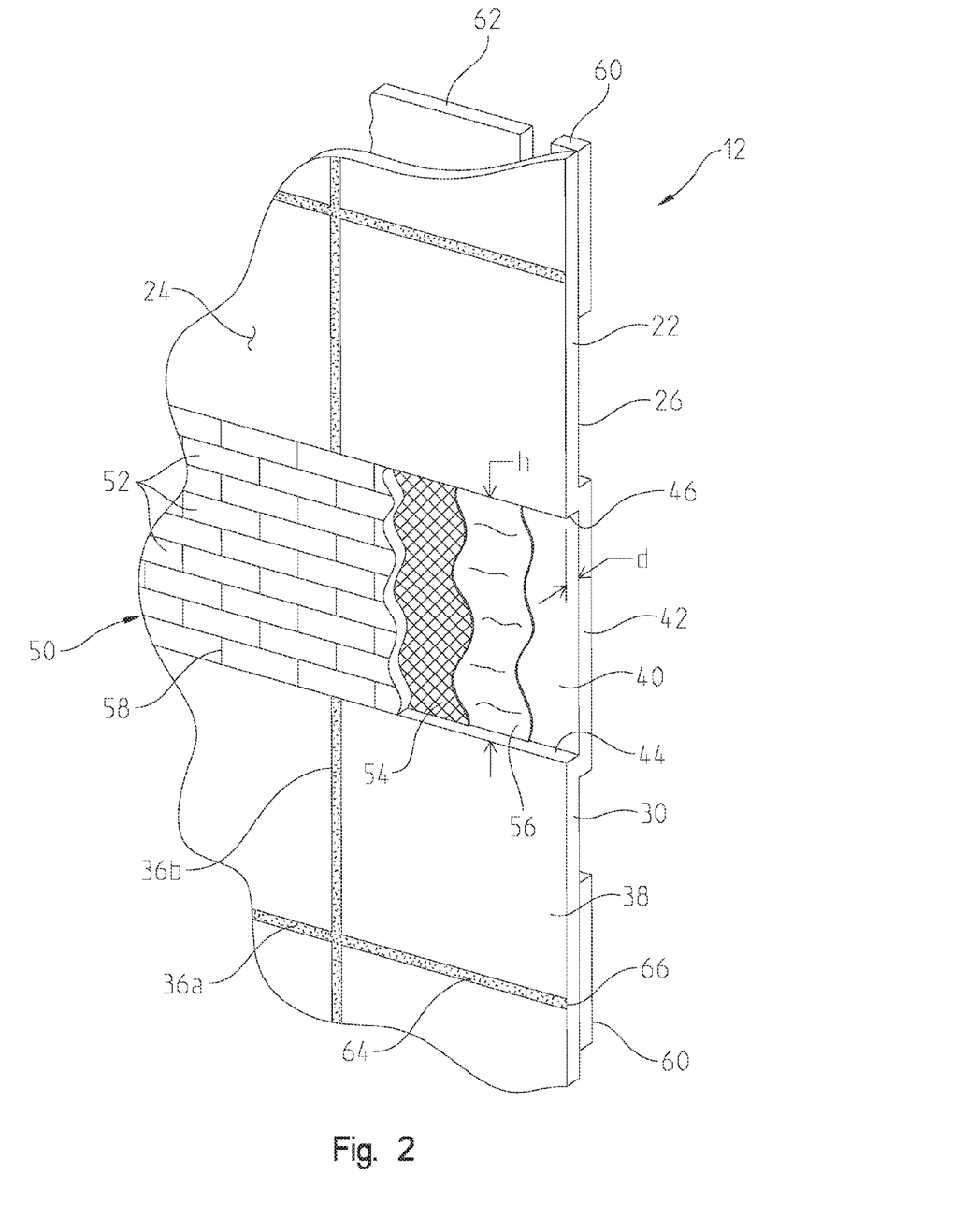
FIG. 2 is a perspective view, with partial cut-aways, of a wall unit of FIG. 1.
Figure 3:
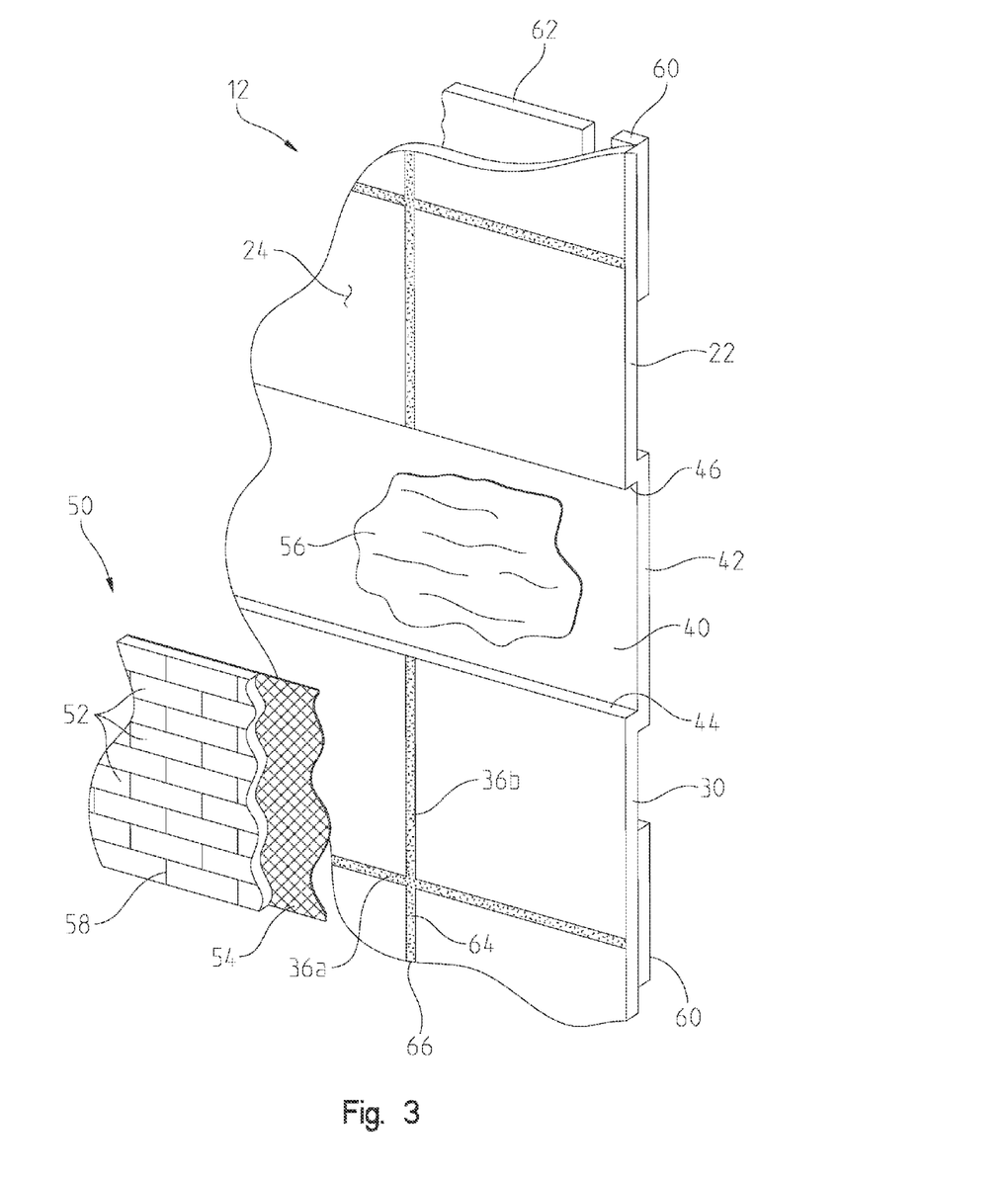
FIG. 3 is an exploded perspective view, with partial cut-aways, of the wall unit of FIG. 2.

With reference to FIGS. 1-3, each wall unit 12 includes a molded wall panel 22 including a front surface 24, a rear surface 26, a first side edge 28, a second side edge 30, an upper edge 32 and a lower edge 34. The front surface 24 and the rear surface 26 extend between the first and second side edges 28 and 30. The front and rear surfaces 24 and 26 also extend between upper and lower edges 32 and 34.

The molded wall panel 22 may be formed from a polymer, illustratively a thermoplastic such as acrylonitrile butadiene styrene (ABS). In certain illustrative embodiments, the front surface 24 may be generally smooth or planar. In other illustrative embodiments, a plurality of linear indentations 36 may be formed in the front surface 24. In such embodiments, a plurality of raised portions 38, illustratively of a polygonal shape, are formed intermediate the linear indentations 36. The linear indentations 36 are configured to simulate grout lines, while the raised portions 38 are configured to simulate conventional ceramic tile.

The linear indentations 36 illustratively include a plurality of horizontal indentations 36a and a plurality of vertical indentations 36b. As such, the raised portions 38 are illustratively of a rectangular shape. In one illustrative embodiment, the raised portions 38 are squares, such as 4 inch×4 inch squares or 6 inch×6 inch squares to simulate conventional ceramic tile dimensions. The polymer of the wall panel 22 may also be capped with a patterned film (e.g., marble, etc.) to create a more realistic tile-like appearance.

In the illustrative embodiment, a recessed pocket 40 is formed within the wall panel 22. The recessed pocket 40 illustratively includes a rear wall 42, a bottom wall 44 and a top wall 46. The recessed pocket 40 illustratively has a depth (d) of approximately 0.38 inches to receive conventional ceramic tiles, such as a mosaic tile assembly 50. The tile assembly 50 illustratively includes individual ceramic tiles 52 of conventional size and shape, as further detailed herein. While ceramic tiles are illustratively used in the tile assembly 50, other materials may be substituted therefor, such as glass or stone.

The height (h) of the recessed pocket 40 may vary depending upon the size, shape and number of mosaic tiles 52 to be inserted within the pocket 40. In an illustrative embodiment, the height (h) of the recessed pocket 40 is between 3 inches and 6 inches. Illustratively, the pocket 40 has a height (h) of approximately 6 inches to facilitate insertion of conventional mosaic tile sheets (typically 12 inches by 12 inches). The mosaic tile sheets would illustratively be cut in half to a length of 12 inches and a height of 6 inches for insertion within the pocket 40.

Illustratively, the pocket 40 extends the full width of the wall panel 22 between the first and second side edges 28 and 30 (i.e., open ends). In alternative embodiments, the pocket 40 may not extend the full width of the wall panel 22 and terminate prior to one or both of the side edges 28 and 30 (i.e., closed end(s)).

Illustratively, the mosaic tiles 52 are supported on a flexible substrate, such as a mesh backing 54. The mesh backing 54 and tiles 52 are adhered to the rear wall 42 of the recessed pocket 40 through conventional means, such as an adhesive 56. Once in position, a finish grout 58, such as an acrylic, may be used to fill in the gaps between adjacent mosaic tiles 52. The tile assembly 50 may be provided with the wall panel 22 as a kit. Alternatively, the tile assembly 50 may be acquired separately by the installer to facilitate customization as desired by the end user.

Reinforcing ribs 60 may be supported by the rear surface 26 of the wall panel 22 to further support the wall panel 22 and provide additional rigidity. The ribs 60 may be spaced at various locations to align with mounting studs 20. In one illustrative embodiment, the ribs 60 may be integrally molded with the wall panel 22. Inserts 62, such as Styrofoam panels may be coupled to the rear surface 62 of the wall panel 22 for additional support through contact with wall studs 20. In one illustrative embodiment, the inserts 62 may be positioned intermediate the ribs 60.

In certain illustrative embodiments, inwardly extending pockets may be formed within the linear indentations 36 of the wall panel 22 to receive conventional grout (not shown). For example, the installer may fill the pockets with grout in a manner similar to conventional ceramic tile.

In other illustrative embodiments, simulated grout 64 may be formed within the front surface 66 of linear indentations 36 between adjacent raised portions 38 in the wall panel 22. More particularly, the linear indentations 36 may be surfaced treated in order to provide for the appearance of simulated grout 64. As further detailed herein, in one illustrative embodiment the surface 66 is treated through a laser etching process. In another illustrative embodiment, the surface 66 is treated through a sand blasting process. In yet another illustrative embodiment, a polymeric colored film may be applied to the surface 66 to define the simulated grout 64.

In the laser etching process, the surface 66 of linear indentations 36 are etched with a laser to turn the simulated grout 64 a different color. The settings of the laser (e.g., intensity, duration) may be modified or varied to obtain different colors of the simulated grout 64. For example, the simulated grout 64 may be gray, brown or black depending upon the laser settings. Additives may be added to the polymer of the wall panel 22 to cause the laser to change the simulated grout 64 to a variety of different colors, such as red, blue, etc. Additionally, the laser may be adjusted to create textures within the polymer of the wall panel 22. In other words, the surface 66 may be roughened by the laser in order to provide a grout-like texture.

In the sand blasting process, a sand or bead blast is utilized to create a grout pattern in the linear indentations 36 of the wall panel 22. Areas of the wall panel 22 that should not be affected (e.g., raised portions 38) may be masked with a fixture. The sand or beads etched/embed within the polymer of the indentations 36 and turn it to a different color. By changing the color of the sand, different grout colors may be provided (e.g., black, gray, brown, etc.). The size of the sand/bead grains may also be adjusted to create different textures.

Figure 4A:
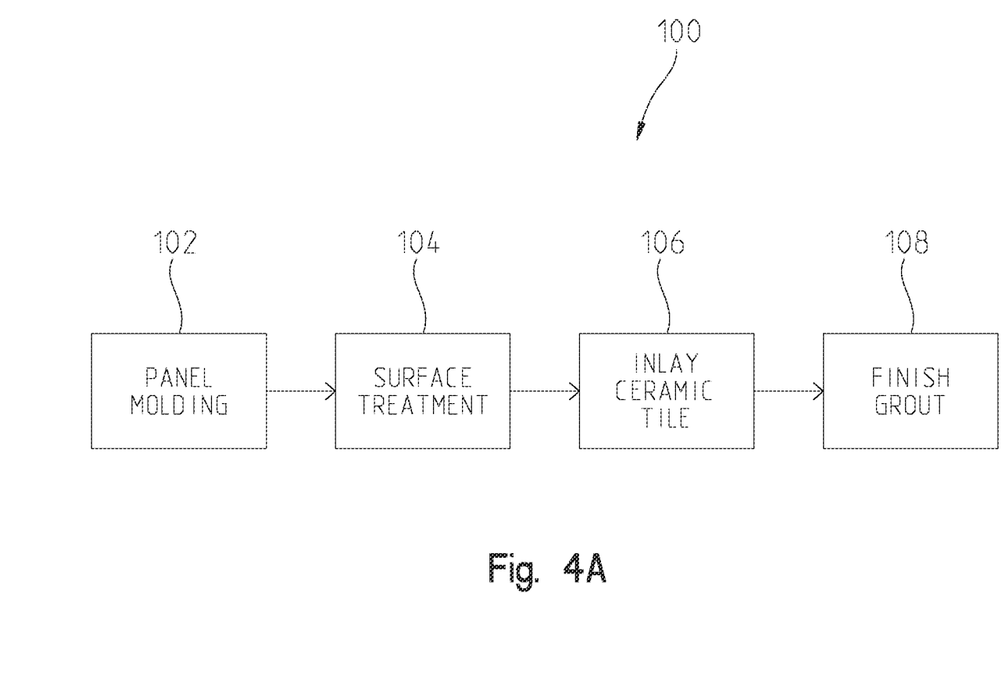
FIG. 4A is a flow chart of an illustrative method of manufacturing the wall unit of FIG. 2.
Figure 4B:
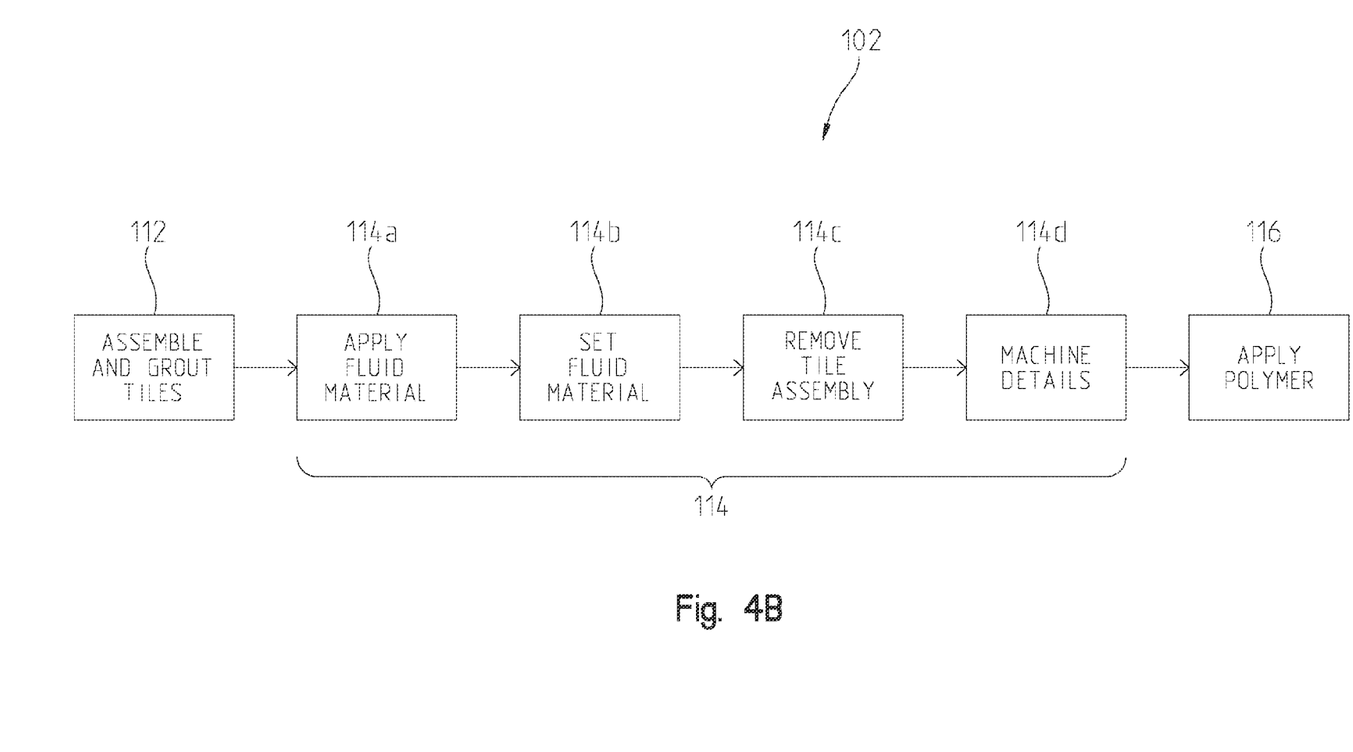
FIG. 4B is a flow chart of an illustrative casting method of FIG. 4A.

With reference to FIGS. 1, 4A and 4B, in an illustrative method of manufacturing 100, the wall panel 22 is formed at block 102, illustratively through applying a thermoplastic, such as ABS, within a mold. The wall panel 22 is molded to define the linear indentations 36 and raised portions 38, along with the recessed pocket 40. In one illustrative embodiment, the wall panel 22 may be molded through a thermoforming process.

With reference to the illustrative panel molding process of FIG. 4B, the mold for forming the wall panel 22 may be formed by using a traditional ceramic tile assembly or wall as a pattern or template. More particularly, at block 112 a ceramic tile assembly or wall is illustratively formed by setting and grouting individual ceramic tiles on a horizontal support surface. A mold is illustratively cast at step 114. More particularly, a fluid material, such as a resin, urethane, aluminum, etc. is cast over the finished ceramic tile assembly at block 114a. The fluid material then sets or hardens at block 114b. The ceramic tile assembly is removed from the set or hardened material at block 114c. The resulting "negative" impression defined by the set material defines a mold used for forming the wall panel 22. Any additional desired details (e.g., recessed pocket 40) may be created within the mold, illustratively through machining, at block 114d.

In an illustrative thermoforming process at block 116, the wall panel 22 is formed from polymer applied to the mold to capture the shape, form and texture (including surface irregularities and/or cavities) of the ceramic tile assembly. The result is a formed wall panel 22 that looks like the original pattern with all of the irregularities or imperfections of the ceramic tile assembly, including the tiles, grout and the human interaction in laying the tile.

At block 104 of FIG. 4A, surface treatment is applied to the front surface 66 of linear indentations 64 to define simulated grout 64. Such surface treatment may be sand blasting and/or laser etching, as further detailed herein.

At block 106 of FIG. 4A, adhesive 56 is applied to the rear wall 42 of the recessed pocket 40 and the tile assembly 50 is secured to the rear wall 42. At block 108, finish grout 58, such as acrylic, may be applied to the tile assembly 50 after it has set to the rear wall 42.

The rear surface of the wall panel 22 illustratively includes mounting members, such as the ribs 60, to bring the panel 22 equal to the wall studs 20 for direct mounting to the studs 20. A hole may be drilled through the rear wall 42 of the recessed pocket 40 at the center of the stud 20. The wall panel 22 is then secured to the stud 20 to provide additional rigidity to the recessed pocket 40. A silicone is illustratively applied to seal the opening. Conventional mounting flanges proximate upper and lower edges 32 and 34 may receive fasteners to secure the wall panel 22 to wall studs 20.

With further reference to FIGS. 5-10, a further illustrative shower enclosure 210 is shown as including many similar components as the shower enclosure 10 detailed above. As such, similar components will be identified with like reference numbers. The illustrative shower enclosure 210 includes bathroom wall units 212a, 212b illustratively supported by wall 18 above a base 213 having a drain 215. Translucent shower partitions (not shown) may be supported above the base 213. Mounting channels 217 may receive edges of the shower partitions.

Each wall unit 212 includes a molded wall panel 222 including a front surface 224, a rear surface 226, a first side edge 228, a second side edge 230, an upper edge 232 and a lower edge 234. The front surface 224 and the rear surface 226 extend between the first and second side edges 228 and 230 and the upper and lower edges 232 and 234. A first mounting flange 236 is supported by the first side edge 228, and a second mounting flange 238 is supported by the second side edge 230. Similarly, a third or upper mounting flange 239 is supported by the upper edge 232. The first mounting flange 236, the second mounting flange 238 and the upper mounting flange 239 are recessed from the front surface 224 of each wall panel 222.

First and second wall panels 222a and 222b may be coupled together through a connecting bracket 240. Illustratively, the connecting bracket 240 includes a body 242 having a first pair of arms 244 and a second pair of arms 246. The first pair of arms 244 includes a first inner arm 244a and a second outer arm 244b defining a first recess 248, while the second pair of arms 246 includes a second inner arm 246a and a second outer arm 246b defining a second recess 250. The first mounting flange 236 of the second wall panel 222b is received within the second recess 250, while the second mounting flange 238 of the first wall panel 222a is received within the first recess 248.

Illustratively, at least one seal 252 is supported by the connecting bracket 240. For example, at least one seal 252 may be supported by the first pair of arms 244, and at least one seal 254 may be supported by the second pair of arms 246. A first inner seal 252a is illustratively supported by the first inner arm 244a, and a first outer seal 252b is illustratively supported by the first outer arm 244b. Similarly, a second inner seal 254a may be supported by the second inner arm 246a, and a second outer seal 254b may be supported by the second outer arm 246b. As further detailed herein, the outer seals 252b and 254b may be eliminated. Furthermore, the outer arms 244b and 246b may be eliminated, wherein the inner arms 244a and 246a trap the respective mounting flanges 238 and 236 of the wall panels 222a and 222b against the wall stud 20.

Illustratively, the body 242 of the connecting bracket 240 is formed of a first material, illustratively a polymer such as a polypropylene. The seals 252 and 254 are illustratively formed of a second material, such as an elastomer or thermoplastic vulcanizate (Santoprene™ TPV). The second material is softer than the first material, such that the seals 252 and 254 frictionally engage and provide effective fluid seals between the mounting flanges 236 and 238 and the body 242 of the connecting bracket 240, while the body 242 of the connecting bracket 240 provides adequate support to the wall panels 222. Illustratively, the first material (e.g., polypropylene) has a hardness or durometer of approximately 75 shore D, while the second material (e.g., TPV) has a hardness or durometer of approximately 50 shore A.

Illustratively, the body 242 of the connecting bracket 240 is co-extruded with the seals 252 and 254 to form a dual extrusion. More particularly, the polypropylene of the body 242 and the TPV of the seals 252 and 254 bond together during the extrusion process.

While the illustrative embodiment details co-extruded body 242 and seals 252, 254, it should be noted that the body 242 may be formed separately from the seals 252, 254. For example, the body 242 may be molded from a polymer or extruded from aluminum with a pocket to receive separately extruded seals 252, 254. The seals 252, 254 could then be pressed into (or otherwise secured within) the pockets of the body 242.

In one illustrative embodiment, the first arms 244 extend substantially perpendicular to the second arms 246, thereby defining a corner bracket 240. A plurality of openings 256 are illustratively formed within the body 242 to receive fasteners (not shown) for securing the bracket 240 to the wall 18. The bracket 240 illustratively extends longitudinally along the full height of the wall panel 222.

Figure 7:
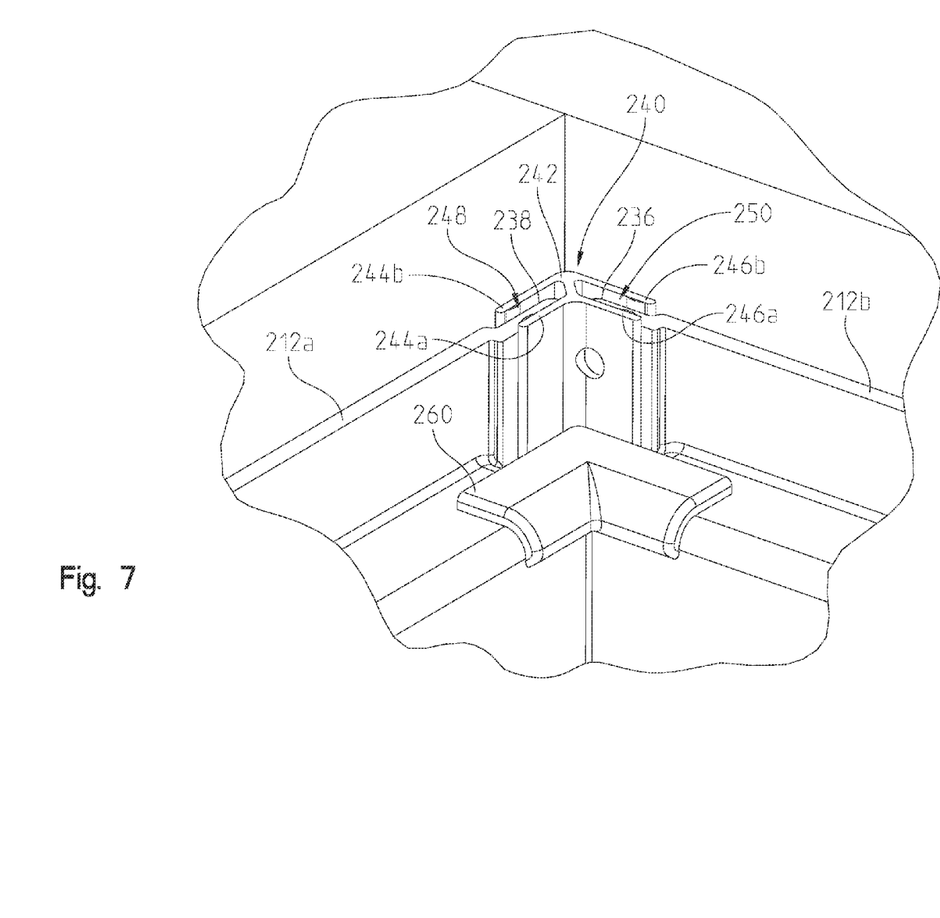
FIG. 7 is a perspective view of the top corner between the wall units of FIG. 5.
Figure 8:
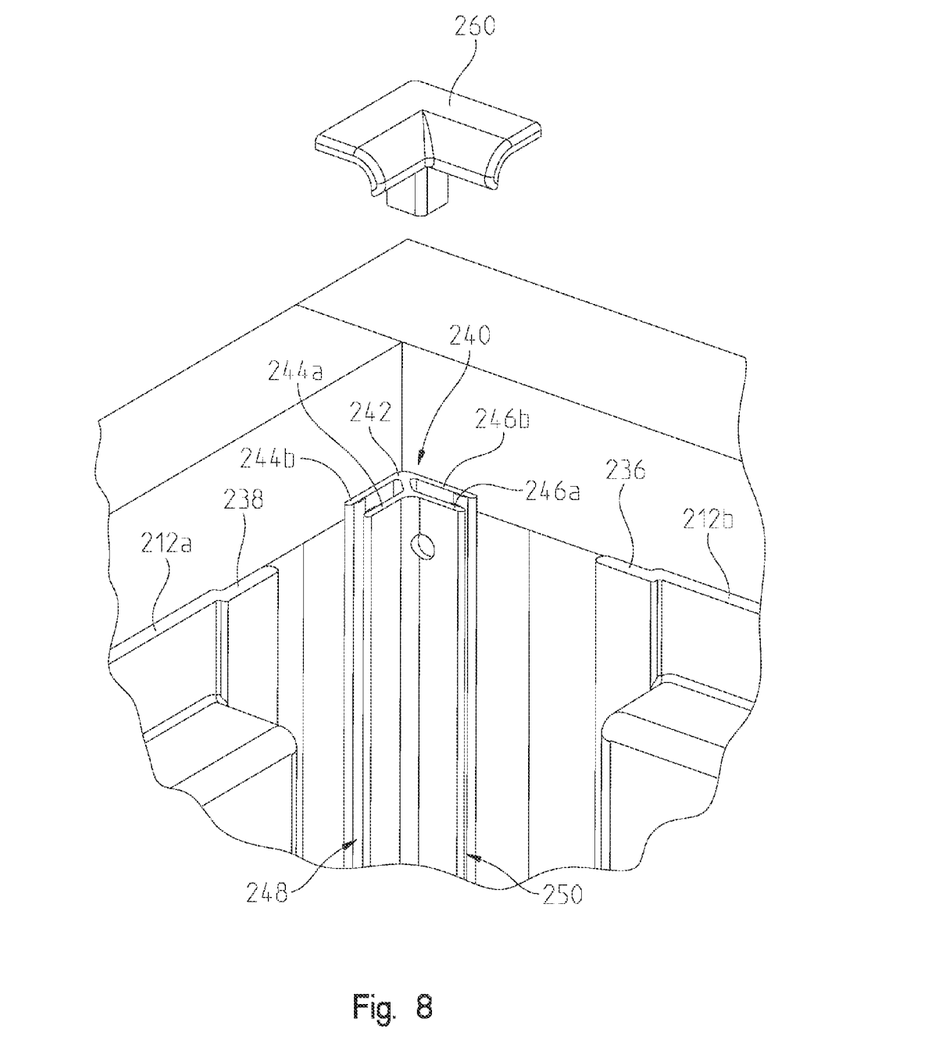
FIG. 8 is an exploded perspective view of the top corner of FIG. 7.
Figure 9:
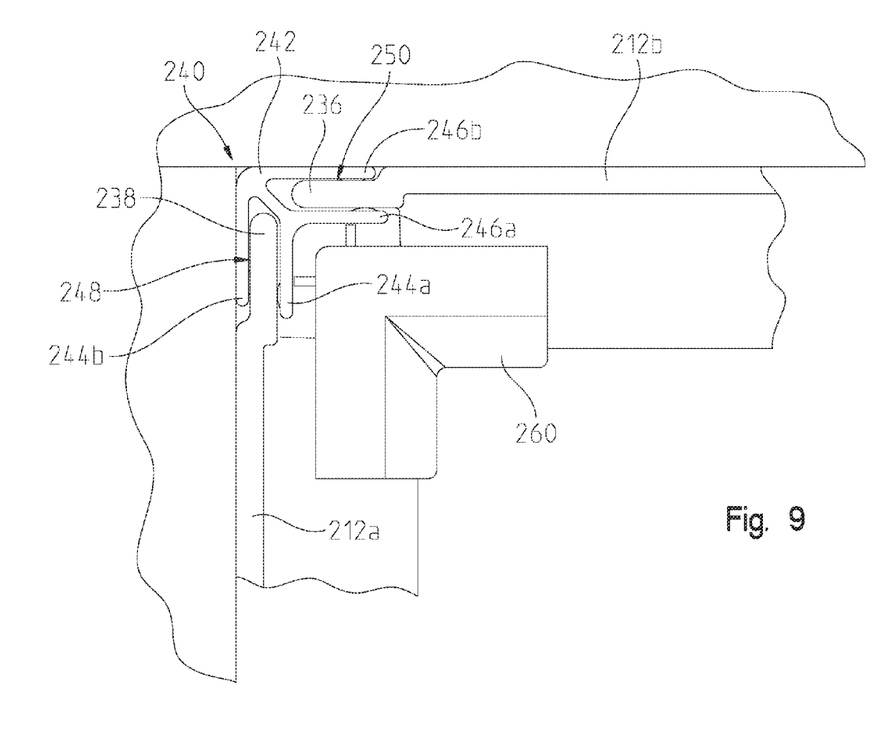
FIG. 9 is a top plan view of the top corner of FIG. 7.
Figure 10:
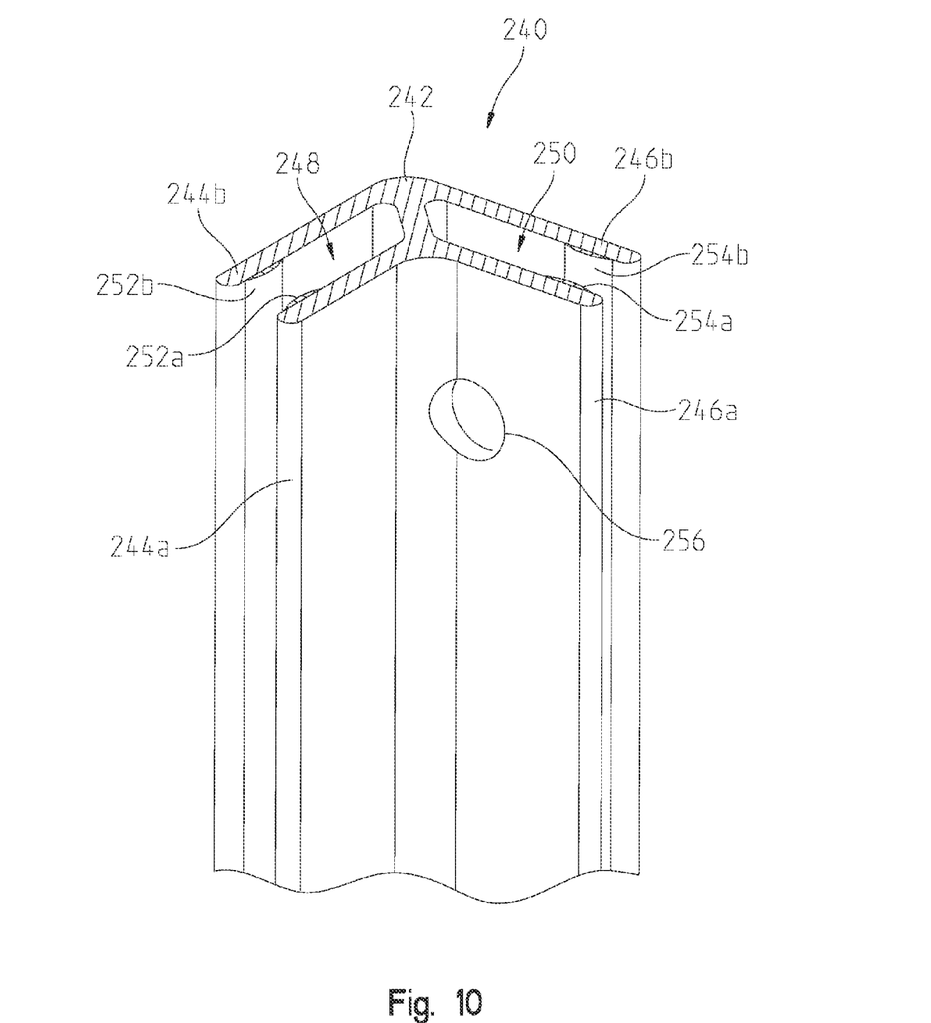
FIG. 10 is a perspective view, in partial cross-section, of the upper end of the corner bracket of FIG. 7.

An upper trim or cap 260 may be secured to the upper end of the wall panels 212a and 212b, illustratively through a conventional adhesive. In certain illustrative embodiments, molded cooperating portions of the panels 222 may replace the cap 260.

In certain illustrative embodiments, an outer corner trim (not shown) may cover the exposed interface or corner joint between the wall panels 222 and extends longitudinally parallel to the corner bracket 240. Alternatively, the corner joint may be sealed with a conventional sealant or caulk.

Figure 11:
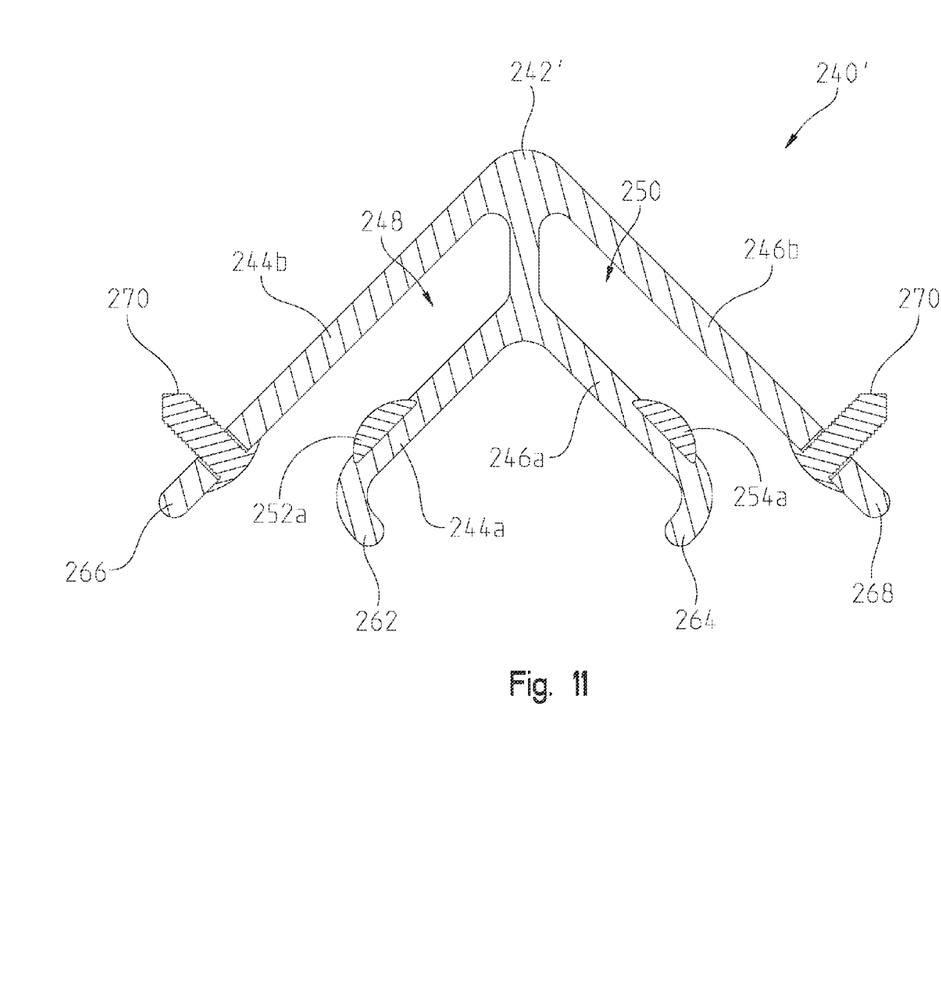
FIG. 11 is a top plan view of a further illustrative corner bracket for use with the shower enclosure of FIG. 5.

A further illustrative corner bracket 240' is shown in FIG. 11 as including many similar features of corner bracket 240 detailed above. The corner bracket 240' includes only inner seals 252a and 254a supported by the inner arms 244a and 246a, respectively. The inner arms 244a and 246a include entrant edges 262 and 264, illustratively curved portions, configured to assist in guiding the mounting flanges 238 and 236 of the wall panels 222a and 222b into the recesses 248 and 250. Additionally, the outer arms 244b and 246b include outer portions 266 and 268 extending beyond the entrant edges 262 and 264 of the inner arms 244a and 246a, and are configured to receive fasteners, such as screws 270 to secure to studs in the wall 18.

Figure 5:
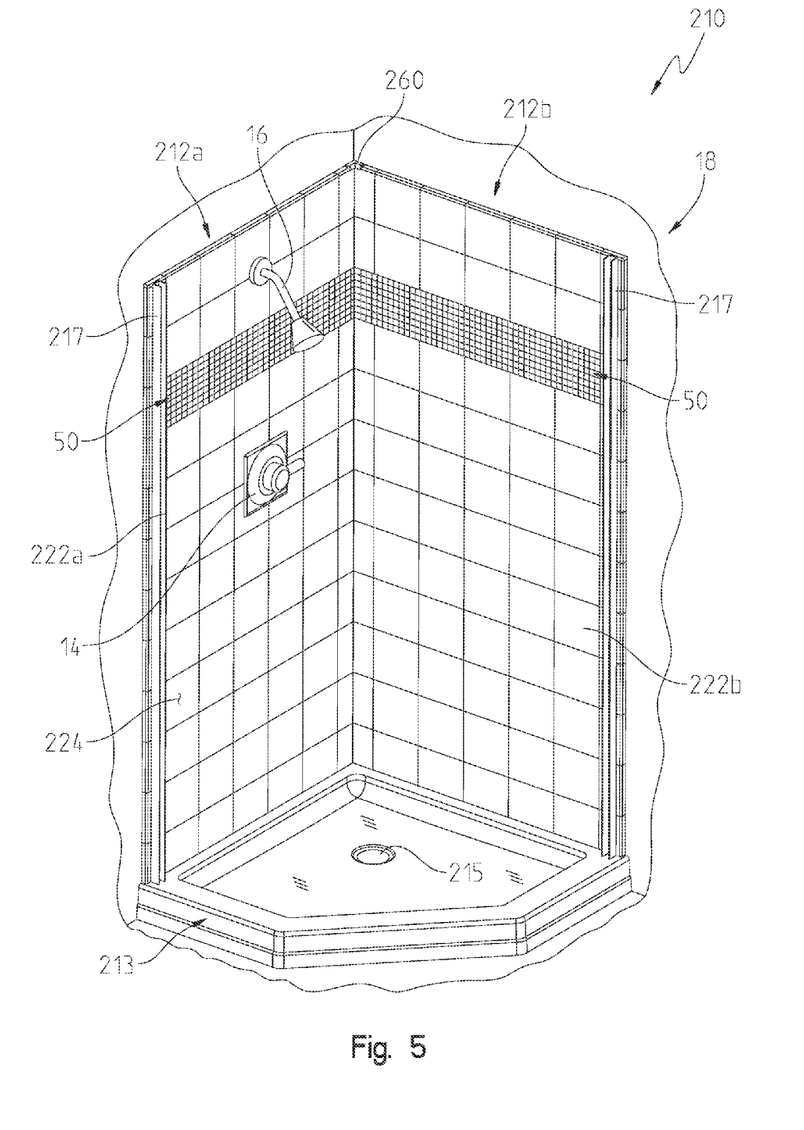
FIG. 5 is a perspective view of a further illustrative shower enclosure including wall units of the present disclosure.
Figure 6:
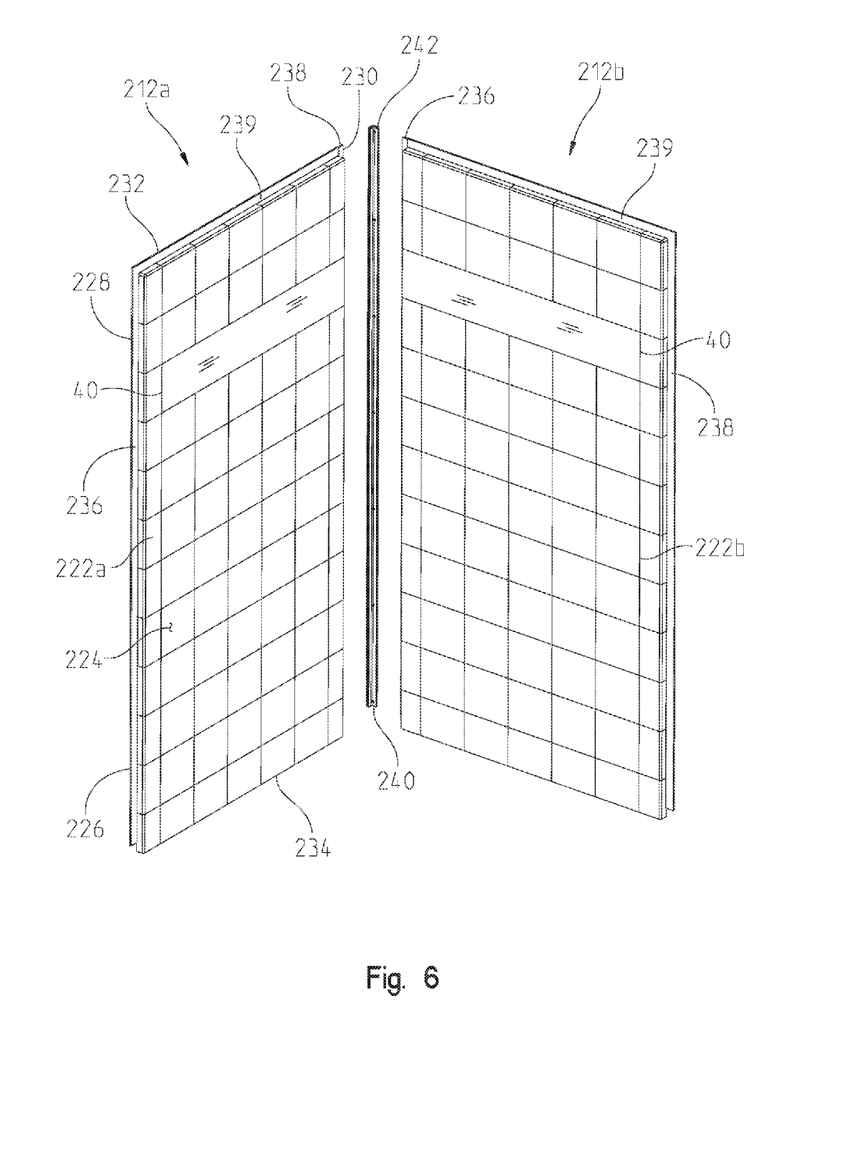
FIG. 6 is an exploded perspective view of the shower enclosure of FIG. 5.

Installation of the shower enclosure illustratively begins by placing the base 213 within the rough-in corner defined by the wall 18. The base 213 is secured to the wall 18 in a conventional manner.

In one illustrative method of installation, the corner bracket 240, 240' is next secured to the wall 18, illustratively through an adhesive and/or screws 270. The first wall panel 222a is secured to the bracket 240, 240', illustratively by lubricating the mounting flange 238 with soap or lubricant and then sliding the flange 238 into the recess 248 of the bracket 240, 240'. The wall panel 222a is then secured to the wall 18 by fasteners, such as screws 270 inserted through upper and side mounting flanges 239 and 236. Next, the mounting flange 236 of the second wall panel 222b is inserted within the recess 250 of the bracket 240, 240'. This process is repeated for additional wall panels 222. Sealant or caulk is then illustratively applied along the corner and bottom joints.

In another illustrative method of installation, a user slides the corner bracket 240, 240' onto the first wall panel 222a and then secures the assembly to the wall 18. More particularly, the flange 238 is slid into the recess 248 of the bracket 240, 240'. Adhesive is applied to the desired wall stud 20, and the wall panel 222a and bracket 240, 240' are pushed into the rough-in corner. The wall panel 222a and bracket 240, 240' are then secured to the wall stud 20 illustratively through screws 270. Holes may be drilled through the wall panel 222a and bracket 240, 240' to facilitate insertion of the screws 270. Next, the mounting flange 236 of the second wall panel 222b is inserted within the recess 250 of the bracket 240, 240'. This process is repeated for additional wall panels 222. The wall panels 222a and 222b are then secured to the wall 18 by fasteners, such as screws 270 inserted through upper and outer side mounting flanges 239 and 236, 238. Sealant or caulk is then illustratively applied along the corner and bottom joints.

Although the invention has been described in detail with reference to certain preferred embodiments, variations and modifications exist within the spirit and scope of the invention as described and defined in the following claims.

The invention claimed is:

1. A bathroom wall unit comprising:
   a wall panel formed from a polymer received within a mold defined by a negative impression of a ceramic tile assembly, the wall panel including a front surface, a rear surface, a first side edge, a second side edge, an upper edge and a lower edge, the front surface and the rear surface extending between the first and second side edges and extending between the upper and lower edges; and
   wherein the wall panel further includes a plurality of linear indentations, a plurality of raised polygonal portions defined between the linear indentations, and a recessed pocket having a rear wall, an upper wall and a lower wall, wherein the polygonal portions are substantially identical to the ceramic tile assembly.

2. The bathroom wall unit of claim 1, further comprising:
   a plurality of mosaic tiles received within the recessed pocket;
   a flexible substrate supporting the mosaic tiles and coupled to the rear wall of the recessed pocket; and
   an adhesive securing the flexible substrate to the rear wall of the recessed pocket.

3. The bathroom wall unit of claim 1, further comprising simulated grout within the linear indentations.

4. The bathroom wall unit of claim 3, wherein the simulated grout comprises sand blasted linear indentations.

5. The bathroom wall unit of claim 3, wherein the simulated grout comprises laser etched linear indentations.

6. The bathroom wall unit of claim 1, further comprising a plurality of ribs coupled to the rear surface of the wall panel, the plurality of ribs sized and configured to protrude rearwardly from the wall panel the same distance as the recessed pocket.

7. The bathroom wall unit of claim 1, wherein the wall panel is thermoformed from acrylonitrile butadiene styrene.

8. A method of forming a bathroom wall unit, the method comprising the steps of:
   arranging a plurality of ceramic tiles on a support surface;
   grouting between the plurality of ceramic tiles to define a ceramic tile assembly;
   applying a liquid material over the ceramic tile assembly;
   setting the liquid material to a solid material;
   removing the ceramic tile assembly from the solid material to define a mold;
   applying a polymer to the mold; and
   molding within the polymer a plurality of linear indentations, a plurality of raised polygonal portions defined between the linear indentations, and a recessed pocket.

9. The method of claim 8, further comprising the step of adhering a plurality of mosaic tiles within the recessed pocket.

10. The method of claim 9, wherein a flexible substrate supports the mosaic tiles and is coupled to a rear wall of the recessed pocket.

11. The method of claim 8, further comprising the step of surface treating the plurality of linear indentations to simulate grout lines.

12. The method of claim 11, wherein the surface treating step comprises sand blasting of the linear indentations.

13. The method of claim 11, wherein the surface treating step comprises laser etching of the linear indentations.

14. The method of claim 8, wherein the molding step comprises thermoforming from acrylonitrile butadiene styrene.

15. A bathroom wall unit comprising:
a first wall panel including a front surface, a rear surface, a first side edge, a second side edge, an upper edge, a lower edge, a first mounting flange supported by the first side edge, and a second mounting flange supported by the second side edge, wherein the first mounting flange and the second mounting flange are substantially identical;
a second wall panel including a front surface, a rear surface, a first side edge, a second side edge, an upper edge, a lower edge, a first mounting flange supported by the first side edge, and a second mounting flange supported by the second side edge;
a connecting bracket including:
a body formed of a first material and including a first pair of arms having a first inner arm and a first outer arm defining a first recess, and a second pair of arms having a second inner arm and a second outer arm defining a second recess, the second mounting flange of the first wall panel received within the first recess, and the first mounting flange of the second wall panel received within the second recess, and
a first seal supported by one of the first inner arm and the first outer arm.

16. The bathroom wall unit of claim 15, further comprising a second seal supported by one of the second inner arm and the second outer arm, the first seal and the second seal formed of a second material softer than the first material.

17. The bathroom wall unit of claim 16, wherein the body, the first seal, and the second seal are co-extruded, the body being formed of a polymer, and the first seal and the second seal being formed of an elastomer.

18. The bathroom wall unit of claim 15, wherein the second mounting flange of the first wall panel is recessed from the front surface of the first wall panel, and the first mounting flange of the second wall panel is recessed from the front surface of the second wall panel.

19. The bathroom wall unit of claim 15, wherein the body of the connecting bracket includes a plurality of longitudinally spaced openings to receive fasteners for securing the connecting bracket to a wall.

20. The bathroom wall unit of claim 15, wherein the first wall panel includes:
a recessed pocket having a rear wall, an upper wall and a lower wall;
a plurality of mosaic tiles received within the recessed pocket;
a flexible substrate supporting the mosaic tiles and coupled to the rear wall of the recessed pocket; and
an adhesive securing the flexible substrate to the rear wall of the recessed pocket.

21. The bathroom wall unit of claim 20, wherein the wall panel further includes a plurality of horizontal linear indentations, a plurality of vertical linear indentations, and a plurality of raised rectangular portions defined between the linear indentations.

22. The bathroom wall unit of claim 16, wherein the first seal comprises a first inner seal supported by the first inner arm, the second seal comprises a second inner seal supported by the second inner arm, a first outer seal is supported by the first outer arm, and a second outer seal is supported by the second outer arm.

23. The bathroom wall unit of claim 22, wherein the first inner seal is positioned between the first inner arm of the connecting bracket and the second mounting flange of the first wall panel, the first outer seal is positioned between the first outer arm of the connecting bracket and the second mounting flange of the first wall panel, the second inner seal is positioned between the second inner arm of the connecting bracket and the first mounting flange of the second wall panel, and the second outer seal is positioned between the second outer arm of the connecting bracket and the first mounting flange of the second wall panel.

24. The bathroom unit of claim 1, further comprising a mold having the negative impression of the ceramic tile assembly to impart a surface texture of the ceramic tile assembly to the plurality of raised polygonal portions.

25. The method of claim 8, wherein the molding step includes imparting a surface texture of the ceramic tile assembly to the plurality of raised polygonal portions.

26. The bathroom wall unit of claim 15, wherein the first mounting flange of the second wall panel and the second mounting flange of the second wall panel are substantially identical.

27. A bathroom wall unit comprising:
a first wall panel including a front surface, a rear surface, a first side edge, a second side edge, an upper edge, a lower edge, a first mounting flange supported by the first side edge, a second mounting flange supported by the second side edge, a recessed pocket having a rear wall, an upper wall, and a lower wall, a plurality of mosaic tiles received within the recessed pocket, a flexible substrate supporting the mosaic tiles and coupled to the rear wall of the recessed pocket, an adhesive securing the flexible substrate to the rear wall of the recessed pocket, a plurality of horizontal linear indentations, a plurality of vertical linear indentations, and a plurality of raised rectangular portions defined between the linear indentations;
a second wall panel including a front surface, a rear surface, a first side edge, a second side edge, an upper edge, a lower edge, a first mounting flange supported by the first side edge, and a second mounting flange supported by the second side edge;
a connecting bracket including:
a body formed of a first material and including a first pair of arms having a first inner arm and a first outer arm defining a first recess, and a second pair of arms having a second inner arm and a second outer arm defining a second recess, the second mounting flange of the first wall panel received within the first recess, and the first mounting flange of the second wall panel received within the second recess, and
a first seal supported by one of the first inner arm and the first outer arm.

28. The bathroom wall unit of claim 27,
wherein the body of the connecting bracket and the first seal of the connecting bracket are co-extruded, the body being formed of a polymer, and the first seal being formed of an elastomer.

29. The bathroom wall unit of claim 27,
wherein the body of the connecting bracket is extruded with a pocket to receive the first seal of the connecting bracket that is separately extruded, the body being formed of a polymer, and the first seal being formed of an elastomer.

\* \* \* \* \*